(12) United States Patent
Ericsson

(10) Patent No.: US 8,584,567 B2
(45) Date of Patent: Nov. 19, 2013

(54) SAW BLADE AND A METHOD OF MANUFACTURING A SAW BLADE

(75) Inventor: Hans Ericsson, Kalmar (SE)

(73) Assignee: Indocean Diamond Tools Limited, Cybercity, Ebene (MU)

( * ) Notice: Subject to any disclaimer, the term of this patent is extended or adjusted under 35 U.S.C. 154(b) by 1053 days.

(21) Appl. No.: 11/791,997

(22) PCT Filed: Dec. 1, 2005

(86) PCT No.: PCT/SE2005/001805
§ 371 (c)(1),
(2), (4) Date: Apr. 17, 2008

(87) PCT Pub. No.: WO2006/059946
PCT Pub. Date: Jun. 8, 2006

(65) Prior Publication Data
US 2008/0264232 A1 Oct. 30, 2008

(30) Foreign Application Priority Data
Dec. 2, 2004 (SE) .................................. 0402928

(51) Int. Cl.
*B27B 33/14* (2006.01)
(52) U.S. Cl.
USPC .................. 83/835; 83/848; 83/855; 83/676
(58) Field of Classification Search
USPC .......... 83/835, 676, 840, 848–853, 854–855; 144/229, 228, 231
See application file for complete search history.

(56) References Cited

U.S. PATENT DOCUMENTS

| | | | |
|---|---|---|---|
| 757,953 A * | 4/1904 | Newton | 407/52 |
| 822,056 A | 5/1906 | Knox | |
| 963,520 A | 7/1910 | Costello | |
| 1,033,996 A * | 7/1912 | Douglas | 83/854 |
| 1,666,987 A * | 4/1928 | Billingsley | 83/854 |
| 2,600,272 A * | 6/1952 | Segal | 83/852 |
| 3,729,808 A * | 5/1973 | Wolf et al. | 407/44 |
| 3,757,397 A * | 9/1973 | Lindsay | 407/46 |
| 4,604,933 A | 8/1986 | Lesher et al. | |
| 4,784,029 A | 11/1988 | Gebelius et al. | |
| 5,090,287 A * | 2/1992 | Chezem | 83/838 |
| 5,104,744 A * | 4/1992 | Haas | 428/596 |
| 5,947,805 A * | 9/1999 | Van Osenbruggen | 451/358 |
| 6,135,004 A | 10/2000 | Gebelius et al. | |

(Continued)

FOREIGN PATENT DOCUMENTS

FR 2192483 2/1974
JP 058115 A 1/1993

(Continued)

*Primary Examiner* — Omar Flores Sanchez
(74) *Attorney, Agent, or Firm* — Birch, Stewart, Kolasch & Birch, LLP

(57) ABSTRACT

A saw blade (4) for a machine operating with adjacent saw teeth traveling in two opposite and parallel directions comprises a blade substrate, teeth (16), and tooth necks (30) formed at the periphery of the substrate for holding the teeth (16) in place. Each tooth neck (30) has a protection surface (34), which is located in a plane that is parallel to the plane of the blade substrate (8), for protecting the tooth (16) against impact with any part of said adjacent saw blade. Each tooth (16) is located on the respective neck (30) in such a way that the tooth (16) is displaced from the protection surface (34) and from the adjacent saw blade in a direction normal to the plane of the protection surface (34).

8 Claims, 5 Drawing Sheets

(56) References Cited

U.S. PATENT DOCUMENTS

| | | | |
|---|---|---|---|
| 6,497,537 B1 * | 12/2002 | Francis et al. | 407/37 |
| 6,684,752 B2 * | 2/2004 | Satran et al. | 83/835 |
| 6,688,206 B1 * | 2/2004 | Mummenhoff | 83/676 |
| 6,769,343 B2 * | 8/2004 | DiSabatino | 83/835 |
| 6,962,147 B2 * | 11/2005 | Hamilton | 125/13.01 |
| 7,127,979 B2 * | 10/2006 | Kocher et al. | 83/848 |
| 7,153,068 B2 * | 12/2006 | Satran et al. | 407/66 |
| 2003/0000363 A1 | 1/2003 | Hofmann et al. | |
| 2003/0136242 A1 | 7/2003 | Hofmann et al. | |
| 2004/0182217 A1 | 9/2004 | Ericsson | |

FOREIGN PATENT DOCUMENTS

| | | |
|---|---|---|
| WO | WO-86/02590 A1 | 5/1986 |
| WO | WO-86/05727 A1 | 10/1986 |
| WO | WO-89/00474 A1 | 1/1989 |

\* cited by examiner

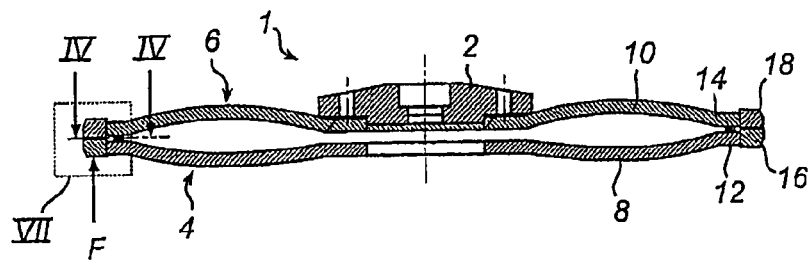
Fig. 1
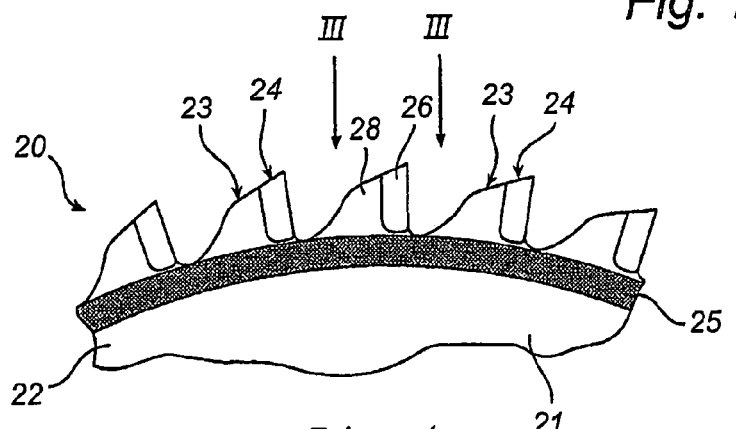
Prior art Fig. 2
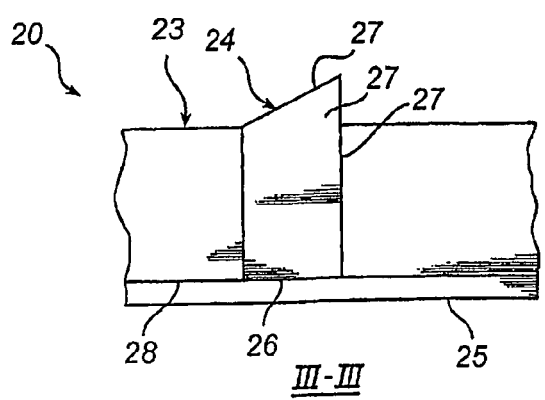
Prior art Fig. 3

SAW BLADE AND A METHOD OF MANUFACTURING A SAW BLADE

FIELD OF THE INVENTION

The present invention relates to a saw blade for a machine operating with adjacent saw teeth traveling in two opposite and parallel directions, said saw blade comprising a blade substrate, teeth, and tooth necks formed at the periphery of the substrate for holding the teeth in place, the saw blade having a surface intended for sliding against a contact area associated with an adjacent saw blade.

The present invention further relates to a method of manufacturing a saw blade for a machine operating with adjacent saw teeth traveling in two opposite and parallel directions, said saw blade comprising a blade substrate, teeth, and tooth necks formed at the periphery of the substrate for holding the teeth in place.

BACKGROUND OF THE INVENTION

Saws using two adjacent, circular saw blades are known from U.S. Pat. No. 963,520 to Costello. The two blades rotate round a common axis but in different directions which makes the sawing easier and the risk of sudden strokes smaller. A saw using only one blade in the form of a belt which cuts in both directions of travel is known from U.S. Pat. No. 822,056 to Knox. Again the advantage is that the sawing becomes easier and safer. It is also possible to arrange two belts running adjacent to each other but with different directions of travel.

A saw blade, which may be a circular disc or a belt depending on the machine, e.g. a twin blade cutter or a band saw, using it, usually consists of two materials. A first material, usually a mild steel, forms the body of the disc or belt. The cutting teeth of the saw blade are formed from a second material, usually a hard metal. The hard metal teeth are fastened to teeth holding necks formed on the mild steel disc or belt.

Since the two saw blades move in opposite directions or move in opposite rotational directions as the case may be, there is a certain risk that the teeth of one of the blades may hit and destroy the teeth of the other blade. The known solution to this problem is to introduce a thin spacer between the two saw blades. The spacer could be a separate detail or a projection on one of the saw blades holding the other saw blade at a desired distance. There is, however, still a certain risk that the teeth of one of the saw blades hit the teeth of the other saw blade, especially when the saw blades are exposed to a strain during the sawing. If the teeth hit each other they are usually destroyed which results in decreased sawing performance of the saw blade. There is also a certain risk that debris from the destroyed teeth may cause injury to the person operating the sawing machine.

SUMMARY OF THE INVENTION

An object of the present invention is to provide a saw blade which enables sawing with adjacent sawing teeth traveling in opposite directions with no or little risk of the teeth traveling in one direction hitting the teeth traveling in the other direction.

This object is accomplished with a saw blade according to the preamble, the saw blade being characterised in that the surface is located adjacent to the tooth necks and that each tooth neck has a protection surface, which is located in a plane that is parallel to the plane of the blade substrate, for protecting the tooth against impact with any part of said adjacent saw blade, each tooth being located on the respective neck in such a way that the tooth is displaced from the protection surface and from the adjacent saw blade in a direction normal to the plane of the protection surface.

An advantage with this saw blade is that the teeth of the blade can not come in contact with the teeth traveling in the other direction. Thus the risk of accidents and destruction of the blade is decreased, particularly in applications were the blade is exposed to forces in varying directions.

Preferably a contact zone located at the periphery of the blade substrate and said protection surfaces are located in substantially the same plane, which is parallel to the plane of the blade substrate, the contact zone and the protection surfaces thus all being able to slide against the contact area of the adjacent saw blade.

This has the advantage that the protection surfaces will support the necks against the adjacent saw blade thus further decreasing the risk of bending the teeth against the adjacent saw blade. The contact zone provides a continuous sliding contact making the sliding between the saw blade and the adjacent saw blade smooth.

According to another preferred embodiment the protection surfaces of the necks extend beyond the substrate in the direction of said adjacent saw blade, the protection surfaces being the surfaces that are able to slide against the contact area of the adjacent saw blade. With only the protection surfaces sliding against the adjacent saw blade a limited friction is obtained.

According to another preferred embodiment a contact zone extends beyond the protection surfaces in the direction of said adjacent saw blade, the contact zone being the surface that is able to slide against the contact area of the adjacent saw blade. With this embodiment only the contact zone need to be machined for sliding against the adjacent saw blade. The protection surface of the respective neck need only be formed for protecting the respective tooth.

Preferably the tooth has an adjacent surface being substantially parallel to the plane of the protection surface, the distance between the adjacent surface and the protection surface being 0.005 to 0.10 mm. A parallel adjacent surface of the tooth makes it easier to control the displacement of the tooth relative to the protection surface. The displacement, i.e. the distance from the protection surface of the neck to the adjacent surface of the tooth, should be such that a good protection is achieved without having a very broad cut.

A further object of the present invention is to provide a method of manufacturing a saw blade which enables sawing with sawing teeth traveling in opposite directions with no or little risk of the teeth traveling in one direction hitting the teeth traveling in the other direction.

This object is accomplished with a method according to the preamble, the method being characterised in that a substrate blank is provided with tooth necks, each tooth neck having a protection surface located in a plane being parallel to the plane of the blade substrate, a tooth is fastened to each tooth neck, the tooth being located such that it becomes displaced from the respective protection surface in a direction normal to the plane of the protection surface.

As described above a saw blade made according to the invention will have a longer life since the tooth is protected by the neck.

The grinding included in the prior art methods is particularly difficult since the simultaneous grinding of a hard material (the tooth) and a soft material (the neck) with the same tool, e.g. a grinding disc, is difficult and often causes the soft material to clog the tool, which must be designed with main focus on the hard material. An advantage of the invention is that the adjacent surface of the tooth need not be grinded after fastening it to the neck. The troublesome simultaneous grinding of the adjacent surface and the tooth neck according to prior art may be thus avoided.

Preferably a surface intended for sliding against a contact area associated with an adjacent saw blade is provided on the saw blade adjacent to the tooth necks. The surface provides a steady abutment so that the two saw blades may slide against each other in a steady way and with minimum wear. Still more preferably said surface is provided on the saw blade by machining at least a peripheral part of the substrate before said step of fastening the teeth. The protection surfaces of the tooth necks and the substrate periphery are peripheral parts of the substrate. The machining should be made on the protection surfaces of the tooth necks and/or on the periphery of the substrate. After the fastening of the teeth the saw blade is thus ready for use, thus the manufacturing of the saw blade becomes efficient with few steps. If desired a final grinding of the cutting surfaces of the teeth may be made. No machining of the substrate, necks or adjacent surface of the tooth is required after fastening the tooth. If the fastening of the tooth is accomplished by a heat adding method, such as soldering, brazing or welding, some cooling at the brazing spot is preferably applied to avoid warping of the substrate and/or neck.

Preferably the tooth is provided with a smooth adjacent surface, the tooth being placed on the neck in such a position that the distance from the adjacent surface to the protection surface will be 0.005 to 0.10 mm. As explained above this placement of the tooth provides for a good protection of the tooth and narrow cutting characteristics of the saw blade.

These and other aspects of the invention will be apparent from and elucidated with reference to the embodiments described hereafter.

BRIEF DESCRIPTION OF THE DRAWINGS

Preferred embodiments of the present invention will now be described with reference to the included drawings.

FIG. 1 is a sectional view of two saw blades mounted on a hub for a twin blade cutter.

FIG. 2 is a partial side view of a saw blade according to prior art.

FIG. 3 is a partial top view along the line III-III of FIG. 2.

DESCRIPTION OF PREFERRED EMBODIMENTS

Figure 4:
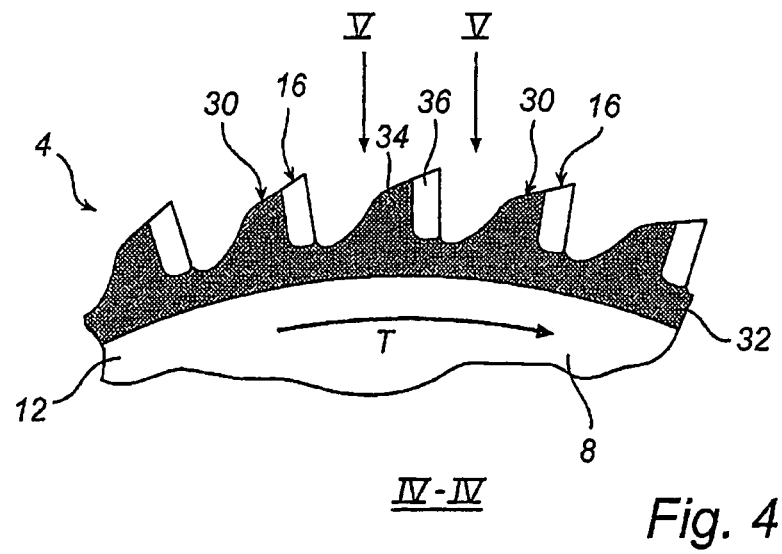
FIG. 4 is a partial side view along the line IV-IV of FIG. 1 of a saw blade according to the invention.

FIG. 1 shows, in section, a saw unit 1 for mounting on a twin blade cutter. The saw unit 1 comprises a hub 2, a first saw blade 4 which can be rotated in a first rotational direction and a second saw blade 6 which can be rotated in another rotational direction being opposite and parallel to said first direction. The first saw blade 4 comprises a blade substrate in the form of mild steel circular disc 8. The second saw blade 6 comprises a similar blade substrate in the form of a circular disc 10. At the periphery 12 of the first disc 8 first teeth 16 are fastened. At the periphery 14 of the second disc 10 second teeth 18 are fastened. The teeth 16, 18 are made from a hard material, such as a sintered metal containing wolfram, a ceramic or any other material suitable for the application, and are brazed to the respective mild steel discs 8, 10.

As is indicated in FIG. 1 the saw blades 4, 6 are slightly curved and bent towards each other. The hub 2 holds the saw blade 6 in such a position in relation to the saw blade 4, being held by a shaft (not shown in FIG. 1), that the saw blades 4, 6 are always in contact with each other at their peripheries 12, 14. This is preferable to provide a narrow, controlled cut. During operation of the twin blade cutter the saw blades 4, 6 slide against each other at their peripheries 12, 14.

In FIG. 2 a part of a prior art saw blade 20 is shown. The saw blade 20 has a mild steel circular disc 21. At the periphery 22 of the disc 21 tooth necks 23 are formed for holding teeth 24. A contact zone 25, shown as a dark arc in FIG. 2, is located at and extends along the periphery 22 of the disc 21. During operation the contact zone 25 slides against a corresponding contact zone located at an adjacent saw blade rotating in the opposite direction.

In FIG. 3 the prior art saw blade 20 is shown as seen in the direction of the arrows III-III shown in FIG. 2. As can be seen the tooth 24 has a face 26 located adjacent to the contact zone 25 and thus adjacent to the adjacent saw blade (not shown) rotating in a direction being opposite to that of the saw blade 20. When manufacturing the above described prior art saw blade 20 an oversized hard metal blank is brazed to the tooth neck 23. The faces 26, 27 of the blank are then grinded to obtain the desired cutting performance of the final tooth 24. The machining of the face 26, which is grinded together with the face 28 of the tooth neck 23, is of particular importance since it is necessary to avoid any contact between the tooth 24 and the teeth of the adjacent saw blade, still achieving an efficient cut.

In FIG. 4 the saw blade 4 according to the invention is shown as seen in the direction of the arrows IV-IV in FIG. 1. At the periphery 12 of the disc 8 tooth necks 30 are formed for holding the teeth 16. A contact zone 32, shown as a dark area in FIG. 4, is located at and extends along the periphery 12 of the disc 8. During operation the contact zone 32 slides against a contact area located at the adjacent saw blade 6 rotating in the opposite direction. As is evident from FIG. 4 the contact zone 32 extends not only along the periphery of the disc 8 but also over the tooth necks 30. The direction of teeth travel is indicated by an arrow T in FIG. 4. It has been found that this design of the contact zone 32 substantially decreases the risk of a tooth neck 30 being bent during sawing in such a way that the teeth 16 come in contact with the adjacent teeth 18 of the saw blade 6.

Figure 5:
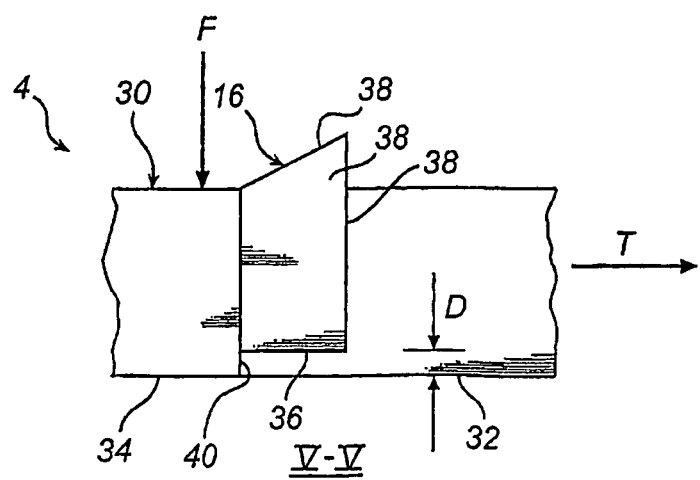
FIG. 5 is a partial top view along the line V-V of FIG. 4.

In FIG. 5 the saw blade 4 is shown as seen in the direction of the arrows V-V in FIG. 4. The tooth neck 30 is provided with a protection surface 34. The protection surface 34 has the purpose of protecting the tooth 16 from coming in contact with the teeth 18 of the adjacent saw blade 6. The protection surface 34 is located in the same plane as the contact zone 32 and in this embodiment forms a part of the contact zone 32. The tooth 16 has an adjacent surface 36 located adjacent to the protection surface 34. Preferably the adjacent surface 36 is parallel with the protection surface 34. As shown in FIG. 5 the tooth 16 is displaced in a direction normal to the plane of the protection surface 34 from the protection surface 34. Thus there is a distance D between the adjacent surface 36 of the tooth 16 and the plane of the protection surface 34. Thus the tooth 16 is protected by the protection surface 34 from coming in contact with the teeth 18 of the adjacent saw blade 6. The arrow T indicates the direction of travel when the saw blade 4 is rotated.

One situation when the saw blade 4 has been found to provide particular benefits is when the user of e.g. the twin blade cutter pushes the saw such that the object to be cut exerts a force in the direction indicated with an arrow F in FIGS. 1 and 5. Such a force F would tend to bend the neck 30 in the direction of the adjacent saw blade 6. The protection surface 34 will however contact and "rest" on parts of the adjacent saw blade 6 and thus protect the tooth 16, being displaced from the plane of the protection surface 34, such that the tooth 16 does not come in contact with any of the teeth 18 or other parts located on the saw blade 6. In addition the neck 30 will have a somewhat larger thickness as compared to prior art thus having an improved resistance to the bending force F. The saw blade 4 thus provides for a longer life time of the teeth 16 and a lower risk of exposing operating personnel to health hazards.

When manufacturing the saw blade 4 a circular disc 8 is first formed from a mild steel blank. The tooth necks 30 are then formed at the periphery 12 of the disc 8. A surface grinding is performed on the whole of that surface of the disc 8 intended to face the adjacent saw blade 6. The protection surfaces 34 and the contact zone 32 all being located on said surface of the disc 8 are thus also ground during this operation. Teeth blanks 16 of a hard metal are subjected to a pre-treatment such that a well defined, smooth adjacent surface 36 is formed on each of the hard metal teeth blanks. Each tooth 16 is then located at a neck 30 such that the adjacent surface 36 is properly positioned thereon. Preferably a laser positioning instrument is used to obtain the correct displacement of the tooth 16 in relation to the protection surface 34. Each tooth 16 is then brazed to its neck 30 in the correct position. In a final step the cutting surfaces 38 of the tooth 16 are machined to obtain the proper cutting characteristics. The adjacent surface 36 is not subjected to any final machining. The saw blade 4 is then ready for use.

Figure 6:
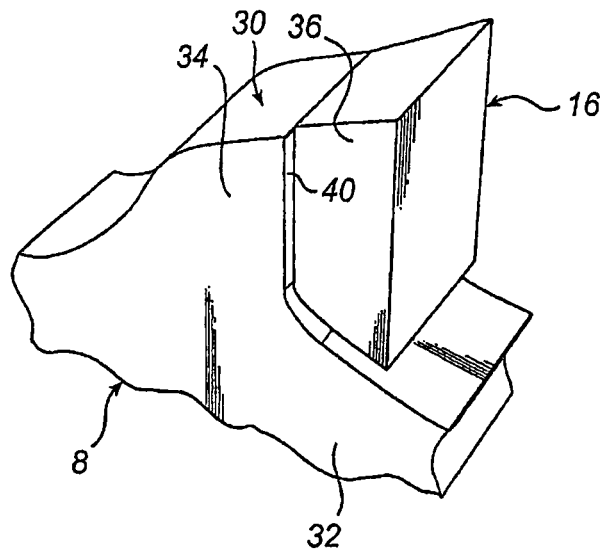
FIG. 6 is a three dimensional view of a tooth neck.

FIG. 6 is a three-dimensional view of the tooth 16 and the neck 30 shown in FIG. 5. As can be seen the protection surface 34 and the contact zone 32 are located in the same plane and actually merge into each other. Since the adjacent surface 36 of the tooth 16 is dislocated from the plane of the protection surface 34 a shoulder 40 is formed on the neck 30. The width of the shoulder 40, i.e. the distance D from the adjacent surface 36 to the protection surface 34, is important for the protection efficiency of the protection surface 34. A large width, i.e. a large D, provides a very good protection of the tooth 16 but increases the width of the cut and may cause the arising of an uncut strip of the material to be cut between the two saw blades 4, 6. A narrow shoulder width, i.e. a small D, decreases the protective effect of the protection surface 34. It has been found that the width of the shoulder 40, i.e. the distance D between the adjacent surface 36 and the protection surface 34, should be 0.005-0.10 mm, still more preferably 0.01-0.03 mm.

Figure 7:
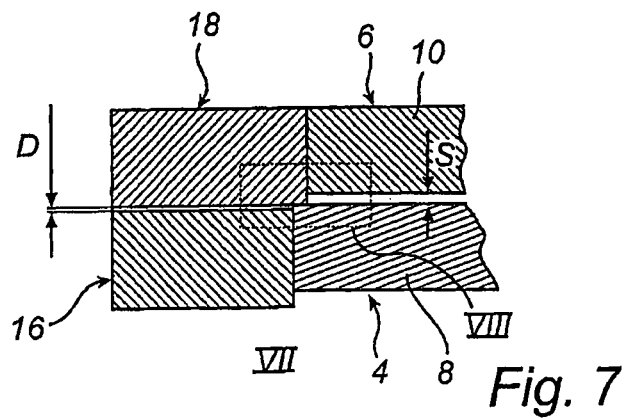
FIG. 7 is an enlarged sectional view and shows the area VII of FIG. 1.
Figure 8:
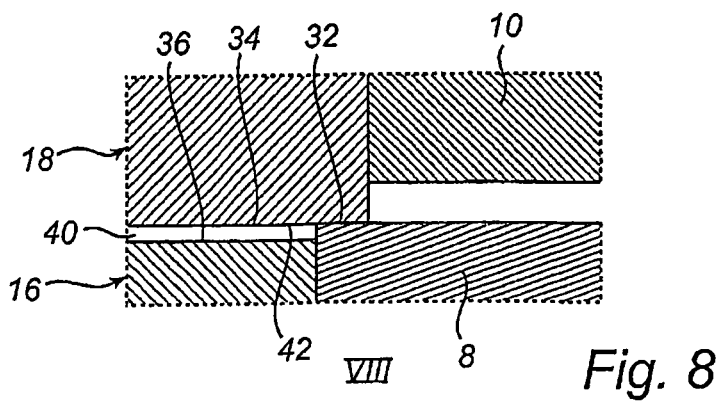
FIG. 8 is a further enlarged sectional view and shows the area VIII of FIG. 7.

FIG. 7 shows the area VII of FIG. 1 in detail. FIG. 7 is a cross-section taken through the tooth 16 and the tooth 18 on their respective disc 8, 10. The two saw blades 4, 6 interact with each other during operation of the saw unit 1. As shown in FIG. 7 the disc 8 of the first saw blade 4 is spaced a distance S from the disc 10 of the second saw blade 6. At the periphery of the discs 8, 10 the distance S is typically about 0.20 mm. As indicated in FIG. 7 the tooth 16 of the first saw blade 4 has a slightly different design compared to the tooth 18 of the second saw blade 6. As is better shown in FIG. 8 the tooth 18 of the second blade 6 is longer than the tooth 16. The tooth 18 also extends from the disc 10 in the direction of the first saw blade 4. The tooth 18 has a contact area or sliding surface 42 located at that face of the tooth 18 being adjacent to the tooth 16 of the first blade 4. As can be seen from FIG. 8 the sliding surface 42 of the tooth 18 slides, when the blades 4 and 6 are rotated in opposite directions, against the contact zone 32 and against the protection surfaces 34 of the first blade 4. The adjacent surface 36 of the tooth 16 is protected by the protection surface 34 of the neck 30 (in the perspective of FIG. 8 only the shoulder 40 of the neck 30 can be seen) and cannot be bent in such a way that the tooth 16 comes into contact with the teeth 18 of the second blade 6.

The second blade 6 is manufactured in a somewhat different manner compared to the first blade 4. A circular disc 10 is first formed from a mild steel blank. Tooth necks, similar to those of the first blade 4, are then formed at the periphery 14 of the disc 10. Tooth blanks 18 are subjected to a pre-treatment such that a well defined, smooth sliding surface 42 is provided on each tooth 18. A tooth blank 18 is then located at each neck such that the tooth blank 18 extends beyond the width of each neck, as indicated in FIG. 7. Preferably a laser positioning instrument is used to obtain the correct placement of the sliding surface 42 in relation to the substrate 10 and the neck. The positioning is made such that the sliding surfaces 42 are in register with each other and extend from the disc 10 in the direction of the first saw blade 4 such that the necks of the second saw blade 6 may never get in contact with any part of the first saw blade 4. Each tooth 18 is then brazed to its neck. In a final step the cutting surfaces of each tooth 18 are machined to obtain the proper cutting characteristics. The saw blade 6 is then ready for use.

Figure 9:
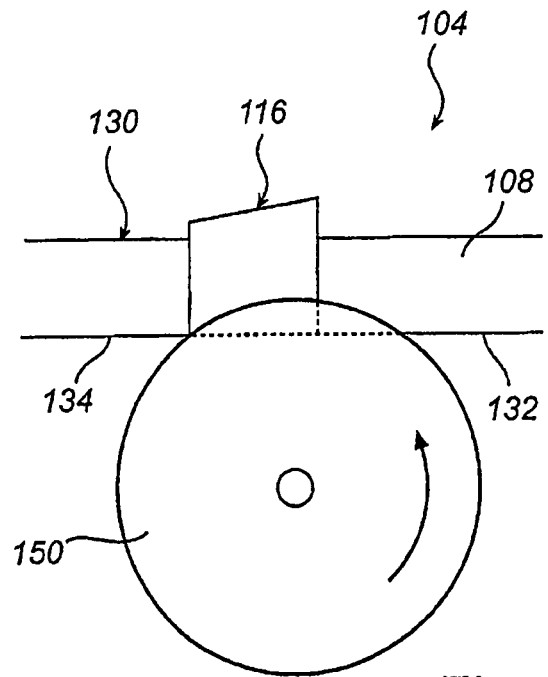
FIG. 9 is a top view and shows the forming of a saw blade according to another embodiment of the invention.
Figure 10:
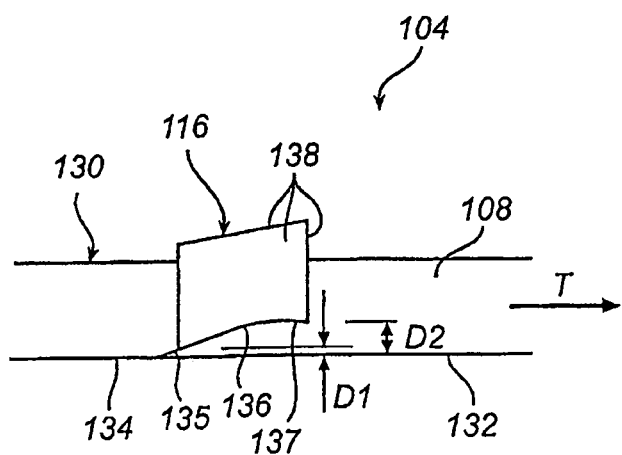
FIG. 10 is a top view of the saw blade of FIG. 9 in its final shape.

FIG. 9 shows a top view (i.e. a similar view as shown in FIG. 5) of the forming of a saw blade 104 according to another, less preferred, embodiment of the invention. In a similar way as described above tooth necks 130 are formed on a mild steel disc 108. Each tooth neck 130 is provided with a protection surface 134. The protection surface 134 has the purpose of protecting a tooth 116 from coming in contact with the teeth of an adjacent saw blade (not shown). The protection surface 134 is located in the same plane as a contact zone 132, which is similar to the contact zone 32 of the saw blade 4. An oversized tooth blank 116 is brazed to each tooth neck 130. A circular grinding disc 150 is lowered from above (i.e. in a direction pointing into the plane of the drawing of FIG. 9) towards the tooth 116. The grinding disc 150 grinds the tooth 116 such that the tooth 116 becomes displaced from the protection surface 134. The grinding results in that the tooth 116 obtains a smooth, slightly curved surface 136 adjacent to the protection surface 134 (FIG. 10 shows the curvature of the surface 136 in an excessive manner). As can be seen from FIG. 10 the grinding thus results in that the part of the tooth 116 being most adjacent to the protection surface 134 becomes located a distance D1 from the protection surface 134. The distance D1 is preferably 0.005 to 0.10 mm, still more preferably 0.01 to 0.03 mm to provide a good protection of the tooth 116. Thus the protection surface 134 protects the tooth 116 from getting into contact with any part of the adjacent saw blade when operating a twin blade cutter using the saw blade 104. The arrow T indicates the direction of travel when the saw blade 104 is rotated. The surface 136 has a portion 137 which is the first portion in the direction of travel T. The portion 137 should be located a distance D2 from the protection surface 134 to provide good cutting characteristics of the saw blade 104. The distance D2 is preferably 0.005 to 0.10 mm, still more preferably 0.01 to 0.03 mm to provide good cutting characteristics of the tooth 116 and still avoid contact with any part of the adjacent saw blade. The diameter of the grinding disc 150 and the location of the grinding disc 150 in relation to the tooth 116 during grinding are chosen such that the requirements for both D1 and D2 can be satisfied. It is also possible to move the grinding disc 150 in a direction parallel to the direction of travel T during grinding. Thus the curvature of the surface 136 may differ from that shown in FIG. 10. If, as an example, the grinding disc 150 is located at the centre of the tooth 116, D1 and D2 will become substantially equal after grinding. As can be seen from FIG. 10 the grinding results in a minor grinding of a small portion 135 of the tooth neck 130. In a final step the cutting surfaces 138 of the tooth 116 are ground to provide the desired cutting characteristics.

It is understood that many modifications to the described embodiments are possible within the scope of the invention.

Figure 11:
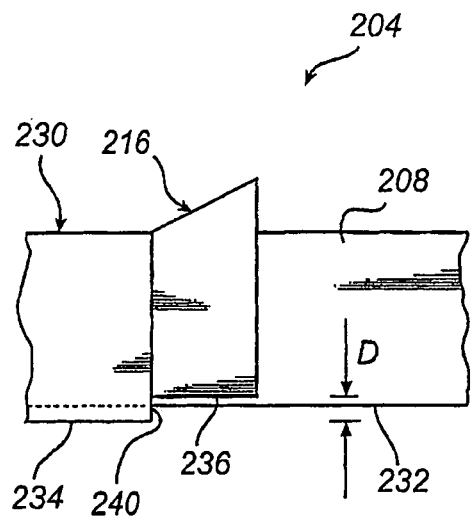
FIG. 11 is a partial top view of a saw blade according to yet another alternative embodiment.
Figure 12:
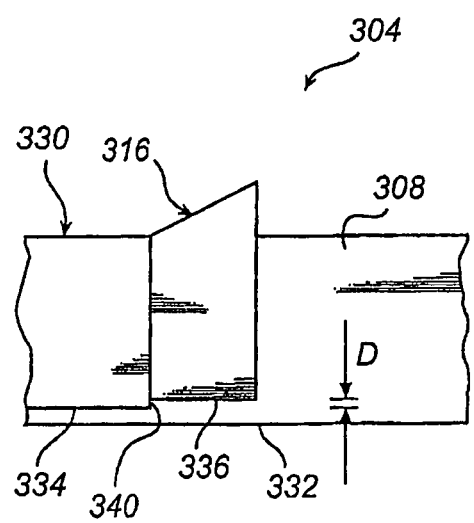
FIG. 12 is a partial top view of a saw blade according to a further alternative embodiment.

In connection with FIG. 7 it is described that the contact zone 32 and the protection surfaces 34 of the first saw blade 4 slide against the sliding surfaces 42 of the teeth 18 of the second saw blade 6. The sliding function may, however, be designed in other ways. FIG. 11 illustrates an embodiment in which necks 230 of a first saw blade 204 extend beyond the width of the actual disc 208, the disc 208 thus having no real contact zone. Each neck 230 has a protection surface 234, from which an adjacent surface 236 of a tooth 216 is displaced a distance D thereby forming a shoulder 240. The protection surfaces 234 are the only surfaces on this first saw blade 204 that slide against a contact area provided on the second saw blade 6 and there is no contact between a disc surface 232 and the second saw blade. FIG. 12 illustrate yet another alternative embodiment in the form of a first saw blade 304. In this saw blade 304 a contact zone 332 is the only part sliding against the second saw blade 6. A protection surface 334 provided on a neck 330 is displaced from the plane of the contact zone 332, thus not in sliding contact with the second saw blade 6. An adjacent surface 336 on a tooth 316 is still further displaced from said contact zone 332, namely a distance D from the protection surface 334, thereby forming a shoulder 340. The tooth 316 is thereby anyway protected from contact with the second saw blade by the protection surface 334. As illustrated with reference to FIG. 11 and FIG. 12 the plane of the protection surface 234, 334 may be displaced some distance from the disc surface 232 or a contact zone 332 of the disc 208, 308 as long as the adjacent surface 236, 336 of the tooth 216, 316 is displaced from the plane of the protection surface 234, 334 and thus still protected by the protection surface 234, 334.

A still further possibility is to introduce a separate spacer between the two saw blades, the spacer then sliding against one of or both of the saw blades. The separate spacer may thus be attached to the first saw blade, to the second saw blade, or may be independent from both blades. With belt saws the spacer could be attached to one of the belts, or the belt if only one, or could be held by a separate means and thus slide against both belts, or, if only one belt, against both parts of the belt traveling in different directions.

The above described invention is described with reference to circular saw blades. It is however also possible to apply the invention to saw blades in the form of belts, such as a belt which cuts in both directions of travel as described in U.S. Pat. No. 822,056 to Knox. In such a case only one saw blade forming a belt loop is used. The necks are arranged on one periphery of the belt. The protection surfaces and contact zone are arranged such that the protection surfaces and contact zone traveling in one direction slides against the protection surfaces and contact zone traveling in the opposite direction.

Another possibility is to apply the invention to saws having saw blades in the form of two separate belts of which at least one has necks with protection surfaces and teeth being dislocated from the plane of the protection surfaces at a periphery of the belt. The protection surface and contact zone of a first belt may slide against corresponding protection surfaces and a contact zone of the second belt. It is also possible to shape one of the belts in correspondence to what is described above for the second saw blade 6 (see FIG. 7). In such a case the protection surfaces and contact zone of the first belt slide against the teeth of the second belt.

In addition to brazing the respective teeth to their respective tooth neck it is also possible to fasten the teeth with the aid of other methods. Examples of such methods include welding, soldering and gluing the teeth to the respective necks.

The invention claimed is:

1. A saw blade for a machine operating with adjacent saw teeth traveling in two opposite and parallel directions, the saw blade comprising a blade substrate, teeth, and tooth necks formed at the periphery of the substrate for holding the teeth in place, the saw blade having a surface intended for sliding against a contact area associated with an adjacent saw blade, wherein said surface is located adjacent to the tooth necks and that each tooth neck has a protection surface, which is located in a plane that is parallel to the plane of the blade substrate, for protecting the tooth against impact with any part of said adjacent saw blade, each tooth being located on the respective neck in such a way that the tooth is displaced from the protection surface and from the adjacent saw blade in a direction normal to the plane of the protection surface, wherein a contact zone located at the periphery of the blade substrate and said protection surfaces are located in substantially the same plane, which is parallel to the plane of the blade substrate, the contact zone and the protection surfaces thus all being able to slide against said contact area, and wherein the tooth has an adjacent surface being substantially parallel to the plane of the protection surface, the distance between the adjacent surface and the protection surface being 0.005 to 0.10 mm.

2. A saw blade for a machine operating with adjacent saw teeth traveling in two opposite and parallel directions, the saw blade comprising:

a blade substrate having a first substrate surface and a second substrate surface opposite to the first surface, teeth, each of the teeth having a top tooth neck surface, a first tooth surface, and a second tooth surface opposite to the first tooth surface, and tooth necks formed at the periphery of the substrate for holding the teeth in place, each of the tooth necks having a top tooth surface, a first tooth neck surface, and a second tooth neck surface opposite to the first tooth neck surface, wherein the first tooth surface is substantially parallel to but displaced from the first tooth neck surface or the first substrate surface by a substantially uniform distance, and wherein a border line of the top tooth neck surface and a border line of the top tooth surface join together, the border line of the top tooth neck surface and the border line of the top tooth surface are substantially located at a same height from the periphery of the blade structure, and the length of the border line of the top tooth surface is shorter than the length of the border line of the top tooth neck surface by the substantially uniform distance.

3. The saw blade of claim 1, wherein each of the tooth necks has a substantially uniform thickness measuring from the first tooth neck surface to the second tooth neck surface, the blade substrate has a substantially uniform thickness measuring from the first substrate surface to the second substrate surface, and the substantially uniform thickness of each of the tooth necks is equal to the substantially uniform thickness of the blade substrate.

4. The saw blade of claim 2, wherein the substantially uniform distance is 0.005 to 0.10 mm.

5. The saw blade of claim 2, the border line of the top tooth neck surface has a length substantially equal to a substantially uniform thickness of a corresponding one of the tooth necks and a substantially uniform thickness of the blade substrate.

6. The saw blade of claim 2, wherein the first tooth neck surface serves as a protection surface protecting a corresponding one of the teeth against impact with any part of an adjacent saw blade.

7. The saw blade of claim 2, wherein the first tooth neck surface is substantially coplanar with the first substrate surface.

8. The saw blade of claim 7, wherein the second tooth neck surface is substantially coplanar with the second substrate surface.

* * * * *